United States Patent
Zeng (10) Patent No.: US 11,448,904 B2
(45) Date of Patent: Sep. 20, 2022

(54) SOLID-STATE REFLECTIVE DISPLAY PANEL AND DISPLAY DEVICE

(71) Applicant: Tianma Micro-Electronics Co., Ltd., Shenzhen (CN)

(72) Inventor: Yang Zeng, Shanghai (CN)

(73) Assignee: Tianma Micro-Electronics Co., Ltd., Shenzhen (CN)

( * ) Notice: Subject to any disclaimer, the term of this patent is extended or adjusted under 35 U.S.C. 154(b) by 251 days.

(21) Appl. No.: 16/695,863

(22) Filed: Nov. 26, 2019

(65) Prior Publication Data

US 2020/0310169 A1 Oct. 1, 2020

(30) Foreign Application Priority Data

Mar. 29, 2019 (CN) .......................... 201910249593.8

(51) Int. Cl.
*G02F 1/01* (2006.01)

(52) U.S. Cl.
CPC ........ *G02F 1/0147* (2013.01); *G02F 2203/02* (2013.01); *G02F 2203/15* (2013.01); *G02F 2203/34* (2013.01)

(58) Field of Classification Search
CPC ............... G02F 1/0147; G02F 2203/15; G02F 2203/34; G02F 2203/02
See application file for complete search history.

(56) References Cited

U.S. PATENT DOCUMENTS

| | | | | |
|---|---|---|---|---|
| 2017/0294481 A1* | 10/2017 | Zhang | ........................ | G09F 9/30 |
| 2018/0017840 A1* | 1/2018 | Broughton | ............ | G02F 1/0322 |
| 2018/0337216 A1* | 11/2018 | Toda | ...................... | H04N 5/369 |
| 2019/0384075 A1* | 12/2019 | Bhaskaran | ............ | G02F 1/0054 |

FOREIGN PATENT DOCUMENTS

CN 109188799 A 1/2019

* cited by examiner

*Primary Examiner* — Mariam Qureshi
(74) *Attorney, Agent, or Firm* — Anova Law Group, PLLC (57) ABSTRACT

A solid-state reflective display panel and a display device are provided. The display panel includes an array substrate and pixel reflection units disposed on the array substrate. Each of the pixel reflection units includes sub-reflection units. Each of the sub-reflection units includes a heating element, a reflecting layer, a resonant cavity and a phase change material layer, stacked in sequence along a direction away from the array substrate. The sub-reflection units include at least a first sub-reflection unit and a second sub-reflection unit that are adjacent to each other. In one of the pixel reflection units, a first surface is a surface of the first sub-reflection unit away from the heating element, and a second surface is a surface of the second sub-reflection unit away from the heating element. An angle between the first surface and the second surface is less than 180 degrees.

17 Claims, 7 Drawing Sheets

SOLID-STATE REFLECTIVE DISPLAY PANEL AND DISPLAY DEVICE

CROSS-REFERENCES TO RELATED APPLICATIONS

This application claims priority of Chinese Patent Application No. 201910249593.8, filed on Mar. 29, 2019, the entire content of which is hereby incorporated by reference.

FIELD OF THE DISCLOSURE

The present disclosure generally relates to the field of display technologies and, more particularly, relates to a solid-state reflective display panel and a display device.

BACKGROUND

Current display technologies include liquid crystal display, organic light emitting display, inorganic light emitting display, electronic paper, etc. There is another display technology called solid-state reflective display, also called solid-state total-reflection display. The solid-state reflective display utilizes a phase change material. Refractive index and/or absorbance of a phase change material may be adjusted by controlling the phase change material to switch between a crystalline state and an amorphous state. A solid-state reflective display device itself does not need a specially provided light source. A solid-state reflective display device may use ambient light as a light source to realize display by reflecting the ambient light. Adjustment of reflectivity of the ambient light may be achieved by adjusting the refractive index and/or absorbance of the phase change material. After a phase change of the phase change material is completed, it is not necessary to continuously apply power to maintain a current state of a device. As such, the solid-state reflective display may be attractive to major manufacturers.

How to improve brightness and contrast of a solid-state reflective display panel, also called a solid-state total-reflection display panel, is currently a technical problem to be solved in the field of display technologies. The disclosed methods and structures are directed to solve one or more problems set forth above and other problems in the art.

SUMMARY

One aspect of the present disclosure includes a solid-state reflective display panel. The display panel includes an array substrate and pixel reflection units disposed on the array substrate. Each of the pixel reflection units includes sub-reflection units. Each of the sub-reflection units includes a heating element, a reflecting layer, a resonant cavity and a phase change material layer, stacked in sequence along a direction away from the array substrate. The sub-reflection units include at least a first sub-reflection unit and a second sub-reflection unit that are adjacent to each other. In one of the pixel reflection units, the first sub-reflection unit includes a first surface, and the first surface is a surface of the first sub-reflection unit away from the heating element; and the second sub-reflection unit includes a second surface, and the second surface is a surface of the second sub-reflection unit away from the heating element. An angle between the first surface and the second surface is less than 180 degrees.

Another aspect of the present disclosure includes a display device. The display device includes a solid-state reflective display panel. The display panel includes an array substrate and pixel reflection units disposed on the array substrate. Each of the pixel reflection units includes sub-reflection units. Each of the sub-reflection units includes a heating element, a reflecting layer, a resonant cavity and a phase change material layer, stacked in sequence along a direction away from the array substrate. The sub-reflection units include at least a first sub-reflection unit and a second sub-reflection unit that are adjacent to each other. In one of the pixel reflection units, the first sub-reflection unit includes a first surface, and the first surface is a surface of the first sub-reflection unit away from the heating element; and the second sub-reflection unit includes a second surface, and the second surface is a surface of the second sub-reflection unit away from the heating element. An angle between the first surface and the second surface is less than 180 degrees.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure more clear and explicit, the present disclosure is described in further detail with accompanying drawings and embodiments. It should be understood that the specific exemplary embodiments described herein are only for explaining the present disclosure and are not intended to limit the present disclosure.

Reference will now be made in detail to exemplary embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for illustration purpose only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

In a conventional reflective display device, ambient light or artificial light directed to a front side (viewer side) of a display panel is often used as a light source. To control a display color of a pixel, a reflective area of the pixel may be divided into three regions with a fixed color, and correspondingly, the pixel may be divided into three sub-pixels. That is, the three regions may reflect three kinds of light including red light, green light, and blue light, respectively, thus realizing color display of the three sub-pixels. Display of one pixel may be achieved by separately modulating reflectivity of the three regions with a fixed color.

Conventionally, each sub-pixel region is provided with a phase change material layer. The phase change material may switch between a first state and a second state. The first state and the second state are may have different optical characteristics. By switching between the first state and the second state, one sub-pixel may display two colors. For a sub-pixel, when manufacturing materials and structure design are completed, the two colors that are switchable may have a mutual relationship and may not be arbitrarily selected. Since both switchable colors may have high reflectivity, it may be difficult to achieve an ideal dark state when a sub-pixel is in a display state, and thus display contrast may be affected. Conventionally, an ideal dark state may be achieved by adding a filter on a display panel. But, when light passes through the filter, there is a certain light loss, and the light loss may in turn decrease brightness of a display panel.

The present disclosure provides a solid-state reflective display panel and display device. The display panel may have a good dark state, high display contrast, and high display brightness.

Figure 1:
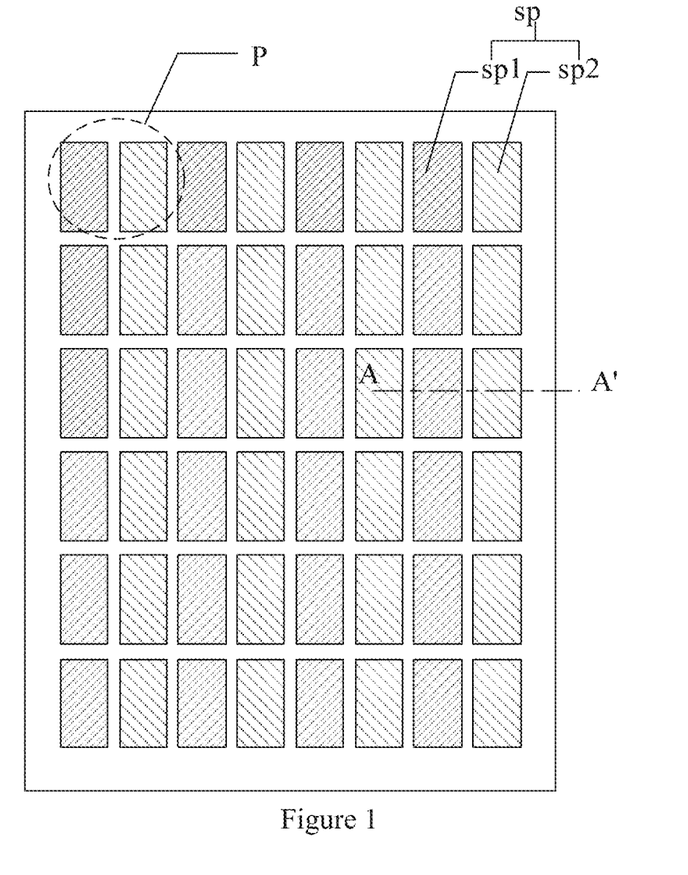
FIG. 1 illustrates a top view of an exemplary solid-state reflective display panel consistent with the disclosed embodiments of the present disclosure.
Figure 2:
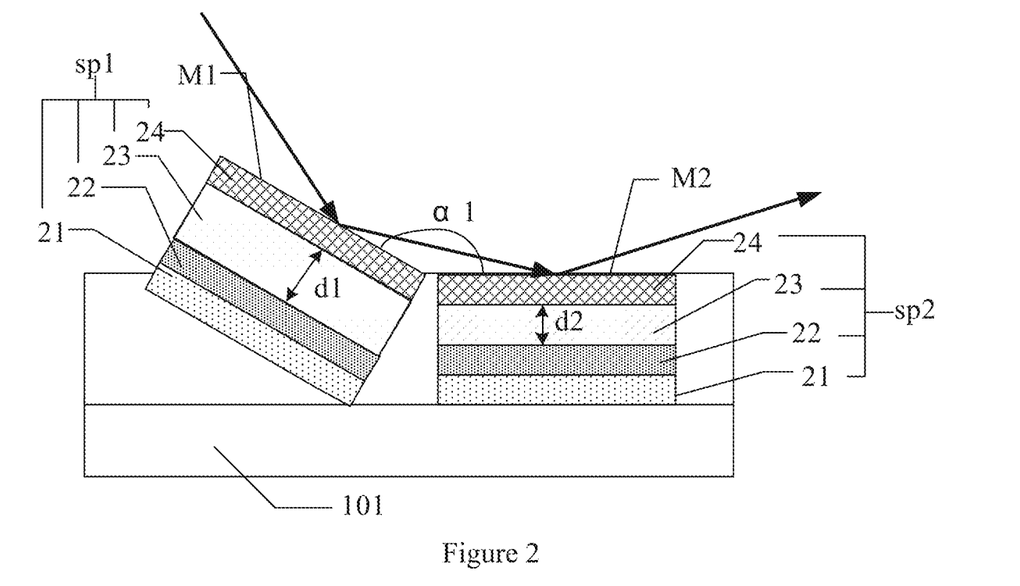
FIG. 2 illustrates a cross-sectional view at cross-section A-A' of the exemplary display panel illustrated in FIG. 1, consistent with the disclosed embodiments of the present disclosure.

FIG. 1 illustrates a top view of an exemplary solid-state reflective display panel consistent with the disclosed embodiments of the present disclosure. FIG. 2 illustrates a cross-sectional view at cross-section A-A' of the exemplary display panel illustrated in FIG. 1.

As shown in FIG. 1, the solid-state reflective display panel includes a plurality of pixel reflection units P. Each of the pixel reflection units P includes sub-reflection units sp, and each of the sub-reflection units sp includes at least a first sub-reflection unit sp1 and a second sub-reflection unit sp2 that are adjacent. Number of sub-reflection units sp in one pixel reflection unit P is not limited, and may be two, three or more. In FIG. 1, number of the sub-reflection units sp and shapes of the sub-reflection units sp in one pixel reflection unit P are for illustration purposes only. In the present disclosure, one pixel reflection unit P may display as one sub-pixel, and a sub-pixel may be understood as a smallest illumination unit in a display panel. One pixel reflection unit P may also display as one pixel unit, and the pixel unit may be understood as an illumination unit including a plurality of sub-pixels. That is, display may be achieved by a plurality of sub-pixels in cooperation with each other.

As shown in FIG. 2, the solid-state reflective display panel includes an array substrate 101 and a plurality of pixel reflection unit P disposed on the array substrate 101. Each of the pixel reflection unit P includes sub-reflection units sp. Each of the sub-reflective units sp includes a heating element 21, a reflecting layer 22, a resonant cavity 23 and a phase change material layer 24, which are stacked in sequence along a direction away from the array substrate. The sub-reflective unit sp includes at least a first sub-reflection unit sp1 and a second sub-reflection unit sp2 that are adjacent.

In a pixel reflection unit P, a first surface M1 is a surface of the first sub-reflection unit sp1 away from the heating element 21, and a second surface M2 is a surface of the second sub-reflection unit sp2 away from the heating element 21. An angle $\alpha 1$ between the first surface M1 and the second surface M2 is not larger than 180 degrees, such that light reflected by the first sub-reflection unit sp1 may irradiate the second sub-reflection unit sp2. Or, light reflected by the second sub-reflection unit sp2 may irradiate the first sub-reflection unit sp1. That is, the pixel reflection unit provided by the present disclosure may have a three-dimensional structure.

As shown in FIG. 2, the first surface M1 is a surface of the phase change material layer 24 away from the heating element 21 in the first sub-reflection unit sp1. A plane of the reflecting layer 22 is parallel to the first surface M1. A surface of the heating element 21 facing away from the reflecting layer 22 may be parallel to the first surface M1 or may be non-parallel to the first surface M1. The second surface M2 is a surface of the phase change material layer 24 away from the heating element 21 in the second sub-reflection unit sp2. A plane of the reflecting layer 22 is parallel to the second surface M2. A surface of the heating element 21 facing away from the reflecting layer 22 may be parallel to the second surface M2 or may be non-parallel to the second surface M2. FIG. 2 is only a schematic representation. In one embodiment, a covering protective layer (not shown) is disposed on the phase change material layer 24.

Both the reflecting layer 22 and the resonant cavity 23 have thermal conductive properties, and the resonant cavity 23 is capable of transmitting light. The phase change material layer 24 is made of a material whose refractive index is reversibly switchable under a heat pulse. By adjusting a thickness of the resonant cavity 23 to match the phase change material layer 24 and utilizing a characteristic that reflectivity may change with light wavelength, adjustment of an optical characteristic of a device may be achieved. The device includes the reflecting layer 22, the resonant cavity 23 and the phase change material layer 24. In the present disclosure, the heating element 21 may be heated. When the heating element 21 is heated, heat may be rapidly transferred to the phase change material layer 24 via the reflecting layer 22 and the resonant cavity 23, such that the phase change material layer 24 may be heated. Accordingly, the phase change material layer 24 may be controlled to switch from one state to another, and thus switching of the refractive index may be realized.

When light is incident on the sub-reflection unit sp, the light first may enter the phase change material layer 24 after refraction. The light then enters the resonant cavity 23, and then exits the resonant cavity 23. After reflected by the reflecting layer 22, the light re-enters the resonant cavity 23. Then, the light is emitted after refraction at the phase change material layer 24. As such, the light is eventually emitted from the phase change material layer 24, after a collective effect of the reflecting layer 22, the resonant cavity 23 and the phase change material layer 24. A wavelength of the emitted light determines a display color of the sub-reflective unit. Accordingly, optical characteristics of the device including the reflecting layer 22, the resonant cavity 23 and the phase change material layer 24 are similar to optical characteristics of a filter. In the present disclosure, the phase change material layer 24 may have two states including a first state and a second state. When the phase change material layer 24 switches between the first state and the second state, a corresponding sub-reflection unit may switch between a color display state and a white state.

With continued reference to FIG. 2, when light is first incident on a surface of the first sub-reflection unit sp1, after being modulated by the first sub-reflection unit sp1 (i.e., after being filtered by the first sub-reflection unit sp1), the light may be reflected to the second sub-reflection unit sp2. Then, after being modulated by the second sub-reflection unit sp2 (i.e., after being filtered by the second sub-reflection unit sp2), the light may be reflected and emitted. The light eventually reflected and emitted is display light, and a wavelength of the display light determines a display color of the pixel reflection unit. That is, in a pixel reflection unit provided by the present disclosure, when the pixel reflection unit displays as one display unit, a display color of the pixel reflection unit is a color of the display light emitted after the filtering of the first sub-reflecting unit and the filtering of the second sub-reflecting unit.

In the present disclosure, both the first sub-reflection unit and the second sub-reflection unit may switch between a color display state and a white state. Display colors of the color display states of the first sub-reflection unit and the second sub-reflection unit may be different. That is, the first sub-reflection unit and the second sub-reflection unit may have different filtering functions. When a sub-reflection unit is in a color display state, reflectivity of light having a same color with the display color of the sub-reflection unit is much larger than reflectivity of light having a color different from the display color of the sub-reflection unit. The sub-reflection unit in a white state may have certain reflectivity to light with different colors. However, for a red sub-reflection unit in a white state, reflectivity of red light may be still greater than reflectivity of green light and reflectivity of blue light. Optical characteristics of a green sub-reflection unit and a blue sub-reflection unit in a white state are similar to optical characteristics of a red sub-reflection unit.

In a pixel reflection unit, for example, the color display state of the first sub-reflection unit is red, and the color display state of the second sub-reflection unit is green. The incident light is white light. In the white light, red light, green light and blue light have a same light proportion q, and a total light amount of the white light is 3q.

To simplify the explanation of the principle, the present disclosure assumes that, when a sub-reflection unit is in a color display state, a reflectivity of light having a same color with a color of the color display state is 90%, and reflectivity of light having a color different from the color of the color display state is 10%. It should be noted that, in an actual case, different sub-reflection units may have different reflectivity for light having a same color with a color of a color display state, and may also have different reflectivity for light having a color different from the color of the color display state.

In the present disclosure, a pixel reflection unit may have a display state 1 and a display state 2. In the display state 1, both the first sub-reflection unit and the second sub-reflection unit are in a color display state. White light is first incident on the first sub-reflection unit, and 0.9q of red light, 0.1q of green light and 0.1q of blue light are reflected. The 0.9q of the red light, the 0.1q of the green light and the 0.1q of the blue light then irradiate the second sub-reflection unit, and 0.09q of the red light, 0.09q of the green light and 0.01q of the blue light are reflected, and a total amount Q1 of the final output light is 0.19q.

In the display state 2, one sub-reflection unit is in a color display state, and the other sub-reflection unit is in a white state. For example, the first sub-reflection unit is in a color display state, and the second sub-reflection unit is in a white state. In this case, white light is first incident on the first sub-reflection unit, and 0.9q of red light, 0.1q of green light and 0.1q of blue light are reflected. Then the 0.9q of the red light, the 0.1q of the green light and the 0.1q of the blue light irradiate the second sub-reflection unit. Since the second sub-reflection unit is in a white state, reflectivity of light of different colors may be large, and a total amount of the final output light may be larger than 0.19q.

As such, in the present disclosure, compared to the display state 2, a pixel reflection unit in the display state 1 may have a less amount of light emitted from the pixel reflection unit after reflection, and may thus have a darker display color.

Conventionally, for example, a display unit may have three sub-reflection units with different colors. Since a sub-reflection unit in a white state may have certain reflectivity for light of different colors, brightness of the display unit when the three sub-reflection units with different display colors are in a white state is larger than brightness of the display unit when the sub-reflection units with different display colors are all in a color display state. That is, conventionally, when a dark state is realized, the three sub-reflection units with different display colors in one display unit are in a color display state.

When the three sub-reflection units of a display unit are all in a color display state, white light with a light amount 3q is used as a light source to illuminate the display unit. A light amount of the white light incident on each of the three sub-reflection units is q, and the light amount for each of red light, green light and blue light is (q/3). In this case, a red sub-reflection unit reflects (q/3)*90% of the red light, (q/3)*10% of the green light, and (q/3)*10% of the blue light. A green sub-reflection unit reflects (q/3)*90% of the green light, (q/3)*10% of the red light, and (q/3)*10% of the blue light. A blue sub-reflection unit reflects (q/3)*90% of the blue light, (q/3)*10% of the green light, and (q/3)*10% of the red light. Eventually, the display unit reflects about 0.37q of the red light, 0.37q of the green light and 0.37q of the blue light, and a total amount Q' of the output light of a dark state is 1.19q. This is a darkest dark state that a conventional technology may achieve.

Comparing a conventional technology with the display state 1 of the present disclosure, since Q1<Q' and Q1≈0.16 Q', brightness of the reflected light in the display state 1 is smaller than the darkest dark state in a conventional state.

The pixel reflection unit in the display panel provided by the present disclosure may have a three-dimensional structure including at least two sub-reflection units. After light is incident on the pixel reflection unit, the light may be emitted to realize display after filtering functions of the two sub-reflection units. The present disclosure may realize a dark state that is darker than a conventional technology, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized.

With continued reference to FIG. 2, in the first sub-reflection unit sp1, in a direction from the heating element 21 to the phase change material layer 24, the resonant cavity 23 has a thickness d1. In the second sub-reflection unit sp2, in a direction from the heating element 21 to the phase change material layer 24, the resonant cavity 23 has a thickness d2, where d1≠d2. In an optical device including a reflecting layer, a resonant cavity and a phase change material layer, the phase change material layer has two reversibly switchable states, and may thus exhibit two different refractive indexes in the two reversibly switchable states. Interference effects may be achieved by setting the resonant cavity to match the phase change material layer. Since reflectivity may change with light wavelength, adjustment of optical characteristics, i.e. switching of reflectivity, of the optical device may be achieved. The interference effect mainly depends on the refractive index of the phase change material layer and the thickness of the resonant cavity. When the thickness of the resonant cavity is different, the sub-reflection unit may exhibit a different color. That is, in a color display state, the sub-reflection unit may have higher reflectivity for light of a specific color, and lower reflectivity for light of other colors.

In the present disclosure, thicknesses of the resonant cavities of the first sub-reflection unit and the second sub-reflection unit are different. Accordingly, display colors of the first sub-reflection unit and the second sub-reflection unit in respective color display states are different. The display color of a pixel unit includes at least following four conditions. In a first condition, the first sub-reflection unit is in a color display state, and the second sub-reflection unit is in a white state. In a second condition, the first sub-reflection unit is in a white state, and the second sub-reflection unit is in a color display state. In a third condition, the first sub-reflection unit and the second sub-reflection unit are both in a color display state. In a fourth condition, the first sub-reflection unit and the second sub-reflection unit are both in a white state. As such, the pixel unit may exhibit at least four display colors. If d1=d2, the display colors of the respective color display states of the first sub-reflection unit and the second sub-reflection unit are same. Accordingly, the display color of one pixel unit only includes following three conditions. In a first condition, one sub-reflection unit is in a white state, and the other sub-reflection unit is in a color display state. In a second condition, both sub-reflection units are in a white state. In a third condition, both sub-reflection units are in a color display state. As such, there are total three display colors. As such, setting d1≠d2 in the present disclosure may increase types of the display colors of the pixel reflection unit. That is, color gamut may be increased, and thus color fullness of display may be improved.

Figure 3:
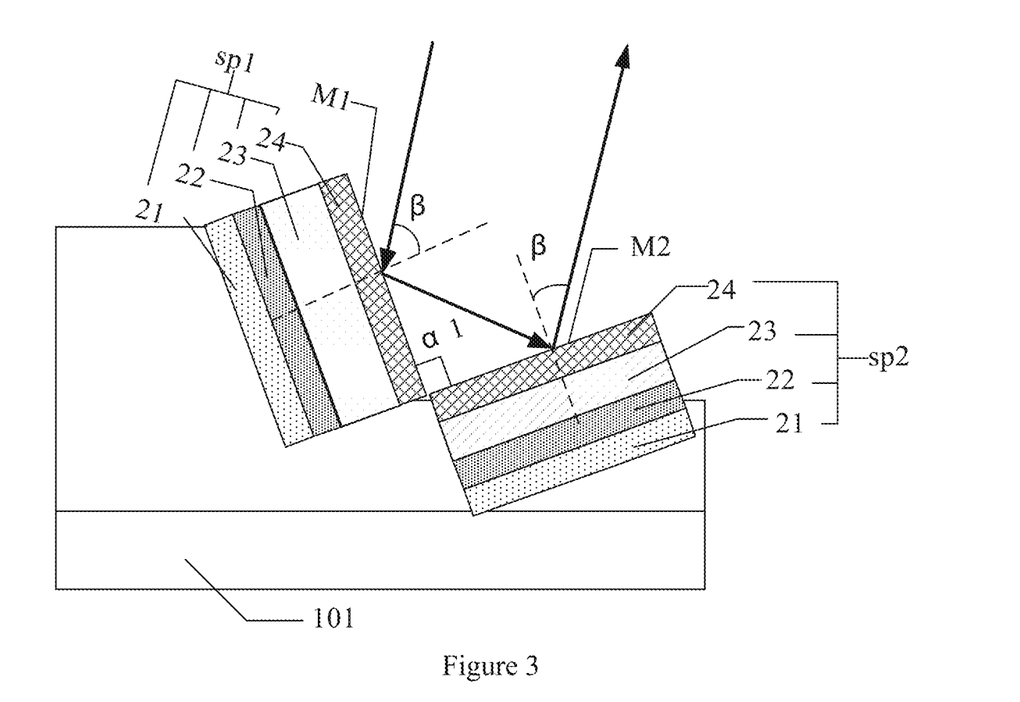
FIG. 3 illustrates another cross-sectional view at cross-section A-A' of the exemplary display panel illustrated in FIG. 1, consistent with the disclosed embodiments of the present disclosure.

FIG. 3 illustrates another cross-sectional view at cross-section A-A' of the exemplary display panel illustrated in FIG. 1. As shown in FIG. 3, in one pixel reflection unit P, an angle between the first surface M1 and the second surface M2 is 90 degrees. In this configuration, one pixel reflection unit includes at least a first sub-reflection unit and a second sub-reflection unit that are adjacent, and an angle α between the first surface and the second surface is not more than 180 degrees. When the pixel reflection unit is in operation, a dark state that is darker than a conventional technology may be realized, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized. Moreover, α is set to be 90 degrees. As illustrated in FIG. 3, according to the law of light reflection, when light is incident on an interface, an incident light and a reflected light made a same angle with a normal line of the interface. For example, an incident light is incident on the first sub-reflection unit sp1 with an incident angle β, and a reflected angle of the light finally emitted by the second sub-reflection unit sp2 is also β. That is, after the light is filtered by the pixel reflection unit, the light may be emitted in a direction in which the incident light is located. In this configuration, a light-emitting direction of a display panel may be adjusted by appropriately setting the pixel reflection unit and the incident direction of a light source, and display effects may thus be improved.

Figure 4:
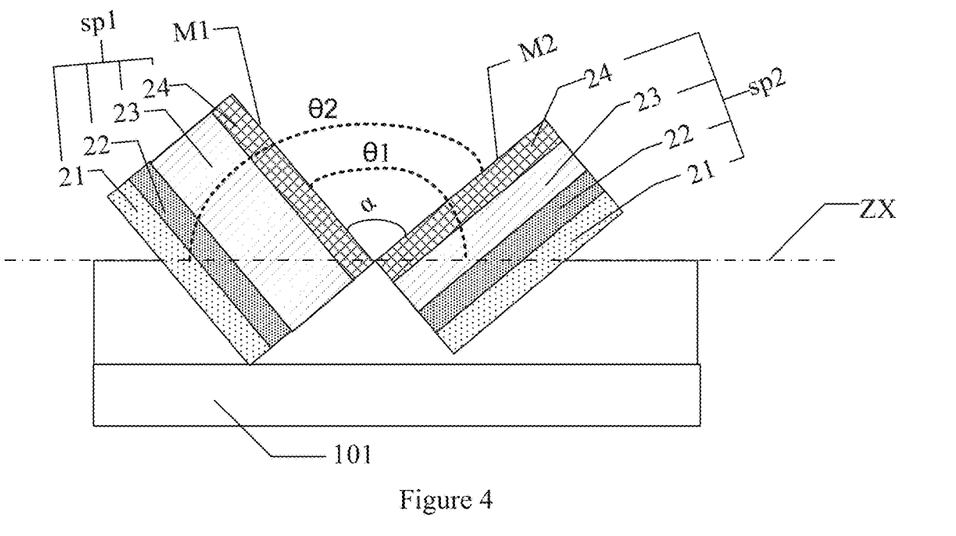
FIG. 4 illustrates another cross-sectional view at cross-section A-A' of the exemplary display panel illustrated in FIG. 1, consistent with the disclosed embodiments of the present disclosure.

FIG. 4 illustrates another cross-sectional view at cross-section A-A' of the exemplary display panel illustrated in FIG. 1. As shown in FIG. 4, in one pixel reflection unit P, angles formed by the first surface M1 and the second surface M2 with a plane where the display panel is located is θ1 and θ2 respectively, where θ1=θ2. The plane where the display panel is located is only indicated by line ZX in the cross-sectional view, and the line ZX is parallel to the plane where the display panel is located.

The configuration illustrated in FIG. 4 may realize a dark state that is darker than a conventional technology, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized. Moreover, since θ1=θ2, relative positions of the first sub-reflection unit and the second sub-reflection unit with respect to the plane where the display panel is located are same. When an incident angle of the incident light with respect to the display panel is same, no matter which sub-reflection unit the light is first incident on, an emitting angle of an emitting light after a final reflection with respect to the display panel is consistent. As such, consistency of an overall light-emitting direction of the display panel may be ensured and display effects may be improved.

Further, orthographic projections of the first sub-reflection unit and the second sub-reflection unit on the array substrate are both rectangular. FIG. 1 illustrates a top view of an exemplary solid-state reflective display panel. Since an orthographic projection direction of the sub-reflection units to the array substrate is same as a top view direction, the orthographic projection of the first sub-reflection unit sp1 on the array substrate coincides with the first sub-reflection unit sp1 in the top view. Also, the orthographic projection of the second sub-reflection unit sp2 on the array substrate coincides with the second sub-reflection unit sp2 in the top view. The orthographic projections of the first sub-reflection unit sp1 and the second sub-reflection unit sp2 on the array substrate are both rectangular. Respective film layers in the corresponding first sub-reflection unit and the second sub-reflection unit are also rectangular in planes where they are located. Rectangle is a regular pattern. When the film layers are formed by etching, masks may have a simple design, and a fabrication process may be simple.

In some embodiments, a first surface and a second surface in a pixel reflection unit may have a same size. That is, the first sub-reflection unit and the second sub-reflection unit may have a same area for incident light. Accordingly, light reflected by one sub-reflection unit may be incident on the other sub-reflection unit, such that the incident light may be emitted after modulations by the two sub-reflection units. As such, a case that an area of one of the sub-reflection units is too small may be avoided. If the area of one of the sub-reflection units is too small, in a display state of the pixel reflection unit, incident light may be emitted after the modulation of only one sub-reflection unit, and color fullness of display may thus be affected.

In a display panel provided by the present disclosure, both the first sub-reflection unit and the second sub-reflection unit include a color display state and a white state. Colors of the color display states of the first sub-reflection unit and the second sub-reflection unit may be different. The pixel reflection unit includes a first display state and a second display state. Following description is based on an exemplary pixel reflection unit, where a color display state of the first sub-reflection unit is red, and the color display state of the second sub-reflection unit is green.

In the first display state, one of the first sub-reflection unit and the second sub-reflection unit is in a color display state, and the other is in a white state. In a first case, the first sub-reflection unit is in a color display state and the second sub-reflection unit is in a white state. Regardless of whether light is incident on the first sub-reflection unit or the second sub-reflection unit first, the light is reflected after superimposition of filtering effects of a red filter (the first sub-reflection unit) and a white filter (the second sub-reflection unit). Accordingly, the pixel reflection unit may display a first color. In a second case, the first sub-reflection unit is in a white state and the second sub-reflection unit is in a color display state. Light is reflected after superimposition of filtering effects of a green filter (the second sub-reflection unit) and a white filter (first sub-reflection unit), and the pixel reflection unit may display a second color. Since the light is filtered by different filters in the first case and the second case, the first color and the second color may be different.

In the second display state, both the first sub-reflection unit and the second sub-reflection unit are in a color display state. In a third case, both the first sub-reflection unit and the second sub-reflection unit are in a color display state. Light is reflected after superimposition of filtering effects of the red filter (the first sub-reflection unit) and the green filter (the second sub-reflection unit), and the pixel reflection unit may display a third color.

For a sub-reflection unit in a color display state, reflectivity of light having a same color with the display color may be much larger than a reflectivity of a light having a color different from the display color. Accordingly, in the third case, after the filtering effect of the first sub-reflection unit, most of the red light is reflected and then emitted, and a small part of the green light and a small part of the blue light are reflected and then emitted. After the light irradiates the second sub-reflection unit, the second sub-reflection unit has a high reflectivity only for green light. At this time, an amount of green light in the incident light is small, so an amount of light eventually reflected by the second sub-reflection unit is small, and thus the pixel reflection unit may display a third color that is darker than the darkest dark state in a conventional technology. That is, the present disclosure may achieve a dark state darker than a conventional technology, and display contrast may thus be improved.

In one embodiment, in a display panel provided by the present disclosure, the pixel reflection unit may further include a third display state. In the third display state, a fourth case may display a fourth color. In the fourth case, the first sub-reflection unit and the second sub-reflection unit are both in a white state. Since sub-reflection pixels in a white state have certain reflectivity for light of different colors, an amount of output light after reflections may be larger than an amount of out light in the third case. Accordingly, brightness of the fourth color may be greater than brightness of the third color.

It may be known from the above description that a pixel reflection unit including a first sub-reflection unit and a second sub-reflection unit may include at least four display colors. The first, the second, the third, and the fourth cases of the pixel reflection units are based on an example where the color display state of the first sub-reflection unit included in the pixel reflection unit is red, and the color display state of the second sub-reflection unit is green. The pixel reflection unit may have two other configurations. In one configuration, the color display state of the first sub-reflection unit is red, and the color display state of the second sub-reflection unit is blue. In another configuration, the color display state of the first sub-reflection unit is green, and the color display state of the second sub-reflection unit is blue. In these two configurations, the four display colors of the pixel reflection unit may be different.

A pixel reflection unit provided by the present disclosure may be used as a smallest display unit. By using different pixel reflection units cooperating with each other (for example, two or three pixel reflection units may collectively display as one display unit), a plurality of different colors may be displayed. Accordingly, color gamut may be increased, and color fullness of display may be improved.

Figure 5:
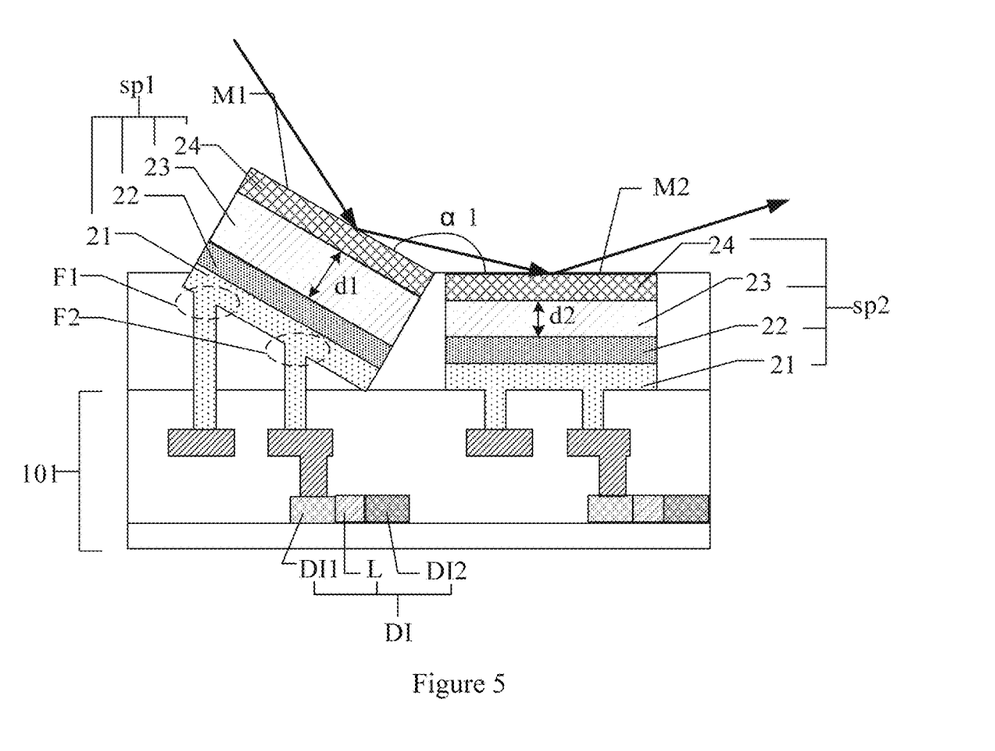
FIG. 5 illustrates another cross-sectional view at cross-section AA' of the exemplary display panel illustrated in FIG. 1, consistent with the disclosed embodiments of the present disclosure.

FIG. 5 illustrates another cross-sectional view at cross-section AA' of the exemplary display panel illustrated in FIG. 1. As shown in FIG. 5, the pixel reflection unit may also include a switching diode DI. The switching diode DI is located on the array substrate 101, and a sub-reflection unit sp is electrically connected to the switching diode DI. FIG. 5 schematically shows that the heating element 21 includes a first signal terminal F1 and a second signal terminal F2. The first signal terminal F1 is connected to a first signal source, and the second signal terminal F2 is connected to an end of the switching diode DI. The switching diode includes a first end DI1, a second end DI2, and a connection region L. The second signal terminal F2 may be connected to the first end DI1, for example. Heating the heating element 21 may be achieved by applying a voltage signal to the first signal terminal F1 and the second signal terminal F2, respectively.

In one embodiment, the pixel reflection unit includes at least a first sub-reflection unit and a second sub-reflection unit that are adjacent, and an angle α between the first surface and the second surface is not more than 180 degrees. When the pixel reflection unit is in operation, a dark state darker than a conventional technology may be realized, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized. Moreover, a diode is used as a switching control device of a sub-reflection unit. When the diode is in operation, a large current or a high voltage may be realized. As such, a large current or a high voltage may be provided to the heating element, and the heating element may be heated quickly. Further, heat may be quickly transferred to the phase change material layer, and a high switching speed between different refractive indices of the phase change material layer may be achieved. Accordingly, switching delay may be reduced, and display effect of the display panel may thus be improved.

Figure 6:
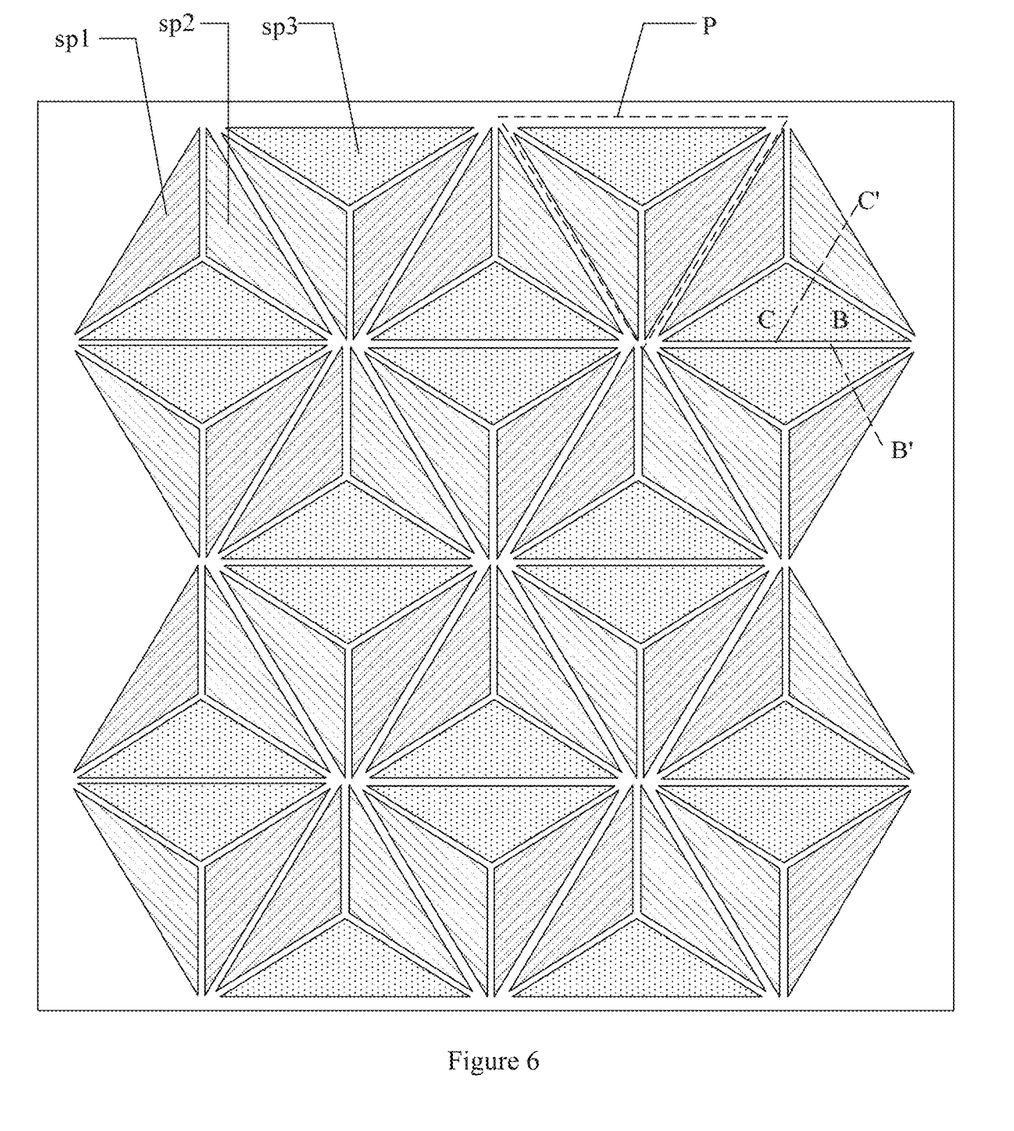
FIG. 6 illustrates a top view of an exemplary solid-state reflective display panel consistent with the disclosed embodiments of the present disclosure.
Figure 7:
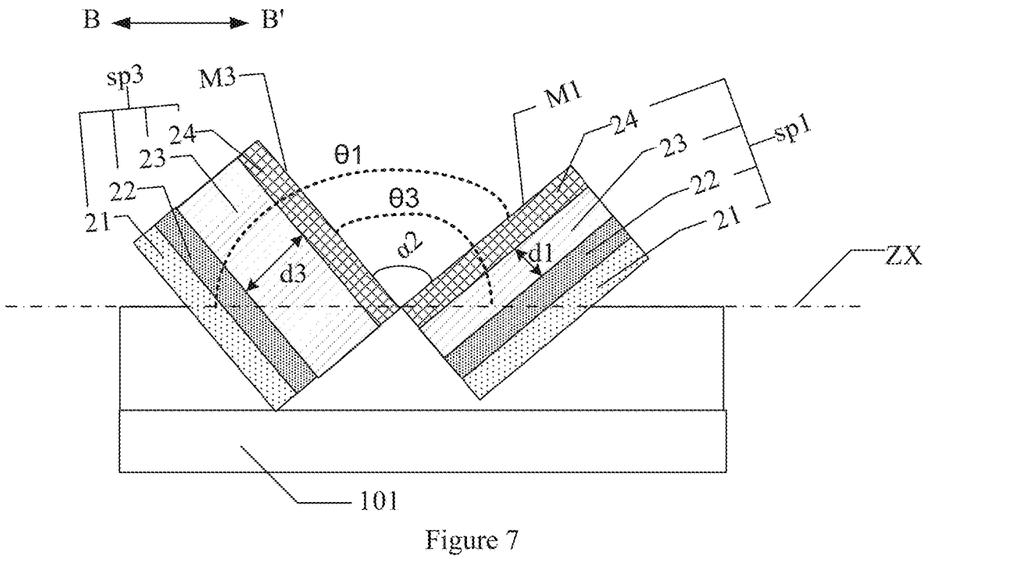
FIG. 7 illustrates a cross-sectional view at cross-section B-B' of the exemplary display panel illustrated in FIG. 6, consistent with the disclosed embodiments of the present disclosure.
Figure 8:
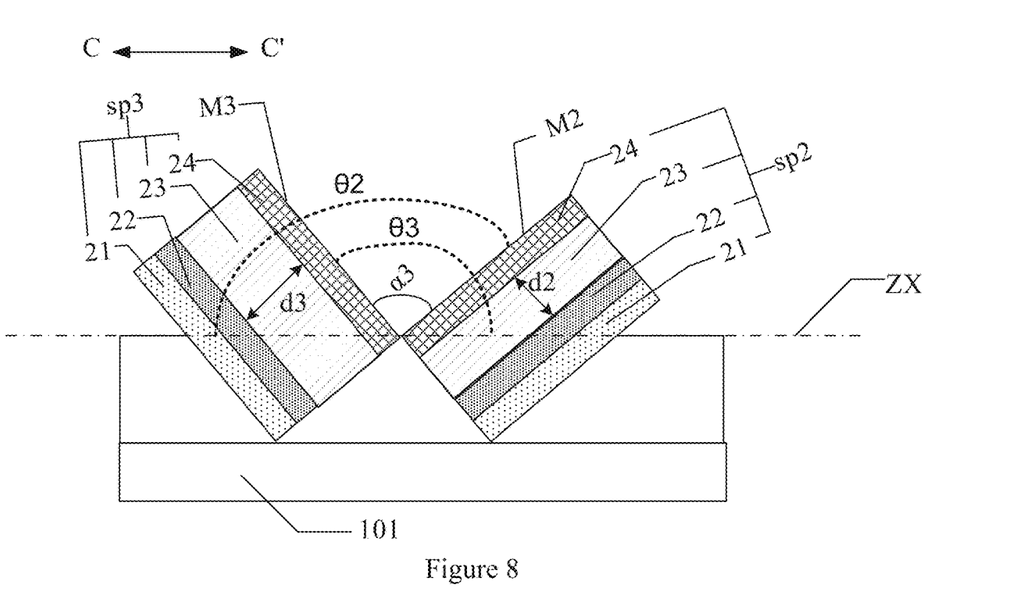
FIG. 8 illustrates a cross-sectional view at cross-section C-C' of the exemplary display panel illustrated in FIG. 6, consistent with the disclosed embodiments of the present disclosure.
Figure 9:
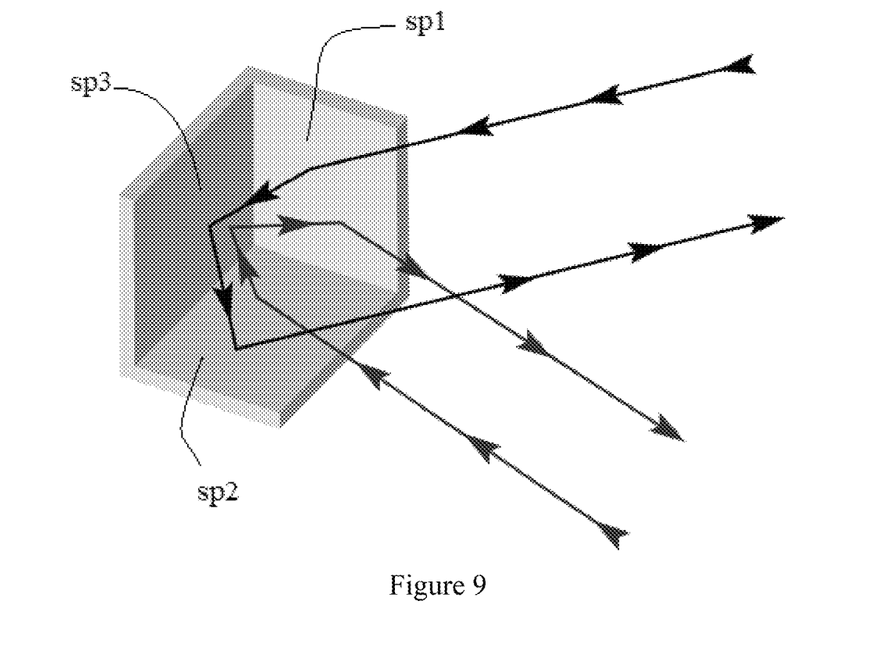
FIG. 9 illustrates a schematic view of optical paths in a pixel reflection unit of an exemplary solid-state reflective display panel, consistent with the disclosed embodiments of the present disclosure.

FIG. 6 illustrates a top view of an exemplary solid-state reflective display panel consistent with the disclosed embodiments of the present disclosure. FIG. 7 illustrates a cross-sectional view at cross-section B-B' of the exemplary display panel illustrated in FIG. 6. FIG. 8 illustrates a cross-sectional view at cross-section C-C' of the exemplary display panel illustrated in FIG. 6. FIG. 9 illustrates a schematic view of optical paths in a pixel reflection unit of the exemplary solid-state reflective display panel.

As show in FIG. 6, a sub-reflection unit may include three sub-reflection units, including a first sub-reflection unit sp1, a second sub-reflection unit sp2, and a third sub-reflection unit sp3. The third sub-reflection unit sp3 is adjacent to the first sub-reflection unit sp1 and the second sub-reflection unit sp2, respectively.

In one embodiment, a plane where the cross-section B-B' is located is perpendicular to the first surface M1 and a third surface M3. As shown in FIG. 7, in the pixel reflection unit P, the third surface M3 is a surface of the third sub-reflection unit sp3 on a side away from the heating element 21. An angle α2 between the third surface M3 and the first surface M1 is not more than 180 degrees.

In one embodiment, a plane where the cross-section C-C' is located is perpendicular to the second surface M2 and the third surface M3. As shown in FIG. 8, an angle α3 between the third surface M3 and the second surface M2 is not more than 180 degrees, where α2 and α3 may or may not be equal. As shown in FIG. 7 and FIG. 8, in the third sub-reflection unit sp3, the third surface M3 is a surface of the phase change material layer 24 on the side away from the heating element 21.

FIG. 9 simply shows relative positions of the first sub-reflection unit sp1, the second sub-reflection unit sp2, and the third sub-reflection unit sp3. Any two of the three sub-reflection units are adjacent to each other and form an angle less than 180 degrees. In the present disclosure, the first sub-reflection unit, the second sub-reflection unit, and the third sub-reflection unit are all switchable between a color display state and a white-state, and display colors of the color display states of the three sub-reflection units may be different. In the pixel reflection unit, light may be incident on any of the three sub-reflection units, and the light may be emitted after reflections of the three sub-reflection units in turn. FIG. 9 illustrates a light path sequentially reflected by the first sub-reflection unit sp1, the third sub-reflection unit sp3, and the second sub-reflection unit sp2. FIG. 9 also illustrates a light path sequentially reflected by the second sub-reflection unit sp2, the third sub-reflection unit sp3 and the first sub-reflection unit sp1.

In one pixel reflection unit, a color display state of the first sub-reflection unit is red, a color display state of the second sub-reflection unit is green, and a color display state of the third sub-reflection unit is blue. An incident light is white light, and in the white light, red light, green light and blue light have a same light proportion q. Accordingly, the white light has a total light amount 3q. To illustrate an operation principle in a simple way, the present disclosure assumes that when a sub-reflection unit is in a color display state, reflectivity of light having a same color with the color display state is 90%, and reflectivity of light having a color different from the color display state is 10%. It should be noted that, in an actual case, different sub-reflection units may have different reflectivity for light having a color same with the color display state, and different sub-reflection units may have different reflectivity for light having a color different from the color display state.

In the present disclosure, in a third display state of a pixel reflection unit, the first sub-reflection unit, the second sub-reflection unit, and the third sub-reflection unit are all in a color display state. When a white light is first incident on the first sub-reflection unit sp1, 0.9q of red light, 0.1q of green light, and 0.1q of blue light are reflected. The light then irradiates the third sub-reflection unit sp3, and 0.09q of the red light, 0.01q of the green light, and 0.09q of the blue light are reflected. The light further irradiates on the second sub-reflection unit sp2, and 0.009q of the red light, 0.009q of the green light, and 0.009q of the blue light are reflected. A total amount of a final output light Q3 is only 0.027q. That is, an amount of final reflected light is small. Compared with the amount of output light Q' (1.19q) in a darkest dark state that may be realized conventionally, the total amount of the final reflected light is small (Q3≈0.023 Q'). When a pixel reflection unit with this configuration performs display in accordance with the third display state, brightness of the reflected light from the pixel reflection unit is smaller than brightness of a darkest dark state in a conventional technology.

In a display panel provided by the present disclosure, a pixel reflection unit may have a three-dimensional structure including three sub-reflection units. When light is incident on the pixel reflection unit, the light may be emitted after filtering functions by the three sub-reflection units, such that display may be realized. The present disclosure may realize a dark state that is darker than a conventional technology, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized.

In the present disclosure, one pixel reflection unit P may display as one sub-pixel, and the sub-pixel may be understood as a smallest illumination unit in a display panel. One pixel reflection unit P may also display as one pixel unit, and the pixel unit may be understood as an illumination unit including a plurality of sub-pixels. That is, a plurality of sub-pixels in cooperation with each other may be needed to realize display.

In one embodiment, with reference to FIG. 7 and FIG. 8, in the first sub-reflection unit sp1, in a direction from the heating element 21 to the phase change material layer 24, the resonant cavity 23 has a thickness d1. In the second sub-reflection unit sp2, in the direction from the heating element 21 to the phase change material layer 24, the resonant cavity 23 has a thickness d2. In the third sub-reflection unit sp3, in the direction from the heating element 21 to the phase change material layer 24, the resonant cavity 23 has a thickness d3, where d1≠d2≠d3. In an optical device including the reflecting layer, the resonant cavity, and the phase change material layer, when the thickness of the resonant cavity is different, the sub-reflection unit may have a different color. That is, for a specific thickness of the resonant cavity, a sub-reflection unit in a color display state may have high reflectivity for a specific color of light, and low reflectivity for other colors of light. In the present disclosure, thicknesses of the resonator cavities of the first sub-reflection unit, the second sub-reflection unit, and the third sub-reflection unit are different. Accordingly, respective display colors of the color display states of the first sub-reflection unit, second sub-reflection unit and third sub-reflection unit may be different.

Display colors of the pixel reflection unit include at least following eight conditions. In a first condition, the first sub-reflection unit is in a color display state, the second sub-reflection unit is in a color display state, and the third sub-reflection unit is in a color display state. In a second condition, the first sub-reflection unit is in a white state, the second sub-reflection unit is in a color display state, and the third sub-reflection unit is in a color display state. In a third condition, the first sub-reflection unit is in a color display state, the second sub-reflection unit is in a white state, and the third sub-reflection unit is in a color display state. In a fourth condition, the first sub-reflection unit is in a color display state, the second sub-reflection unit is in a color display state, and the third sub-reflection unit is in a white state. In a fifth condition, the first sub-reflection unit and the second sub-reflection unit are both in a white state and a third sub-reflective unit is in a color display state. In a sixth condition, the first sub-reflection unit and the third sub-reflection unit are both in a white state, and the second sub-reflection unit is in a color display state. In a seventh condition, the second sub-reflection unit and the third sub-reflection unit are both in a white state, and the first sub-reflection unit is in a color display state. In an eighth condition, all the three sub-reflection units are in a white state. As such, there may be total eight display colors. If sizes of any of d1, d2, or d3 are set to be same, some of the display colors may be lost. Accordingly, in the present disclosure, by setting $d1 \neq d2 \neq d3$, types of display colors of the pixel reflection unit may be increased. As such, color gamut may be increased, and color fullness of display may be increased.

In a pixel reflection unit of a display panel provided by the present disclosure, all the first sub-reflection unit, the second sub-reflection unit, and the third sub-reflection unit includes a color display state and a white state, and colors of the color display states of the three sub-reflection units are different. The pixel reflection unit may have a first display state and a second display state. The following is an example in which the color display state of the first sub-reflection unit is red, the color display state of the second sub-reflection unit is green, and the color display state of the third sub-reflection unit is green.

In the first display state, one of the first sub-reflection unit, the second sub-reflection unit, and the third sub-reflection unit is in a color display state, and the other two are in a white state. In the first display state, the pixel reflection unit provided by the present disclosure may display three colors respectively. Following is an example where the first sub-reflection unit is in a color display state, and the other two are in a white state. Regardless of which sub-reflection unit incident light is first incident on, the incident light is filtered by a red filter (the first sub-reflection unit) and two white filters (the second sub-reflection unit and the third sub-reflection unit). After superimposition of filtering effects of the three filters, the incident light is reflected out. Due to the filtering effect of the first sub-reflection unit, most of green light and blue light in the incident light is filtered away, and only most of red light may be reflected. Since a white filter may have high reflectivity for all colors of light, after filtering described above, most of the green light and blue light in the incident light may be filtered away, and the pixel reflection unit may display a purer red color. In a same way, when the second sub-reflection unit is in a color display state, and the other two are in a white state, the pixel reflection unit may display a purer green color. When the third sub-reflection unit is in a color display state and the other two are in a white state, the pixel reflection unit may display a purer blue color.

In the second display state, the first sub-reflection unit, the second sub-reflection unit, and the third sub-reflection unit are all in a color display state. When the reflection pixel unit is in operation, after superimposition of filtering effects of a red filter (the first sub-reflection unit), a green filter (the second sub-reflection unit), and a blue filter (the third sub-reflection unit), light is reflected out. For a sub-reflection unit in a color display state, reflectivity of light with a same color with the display color of the sub-reflection unit is larger than reflectivity of light with a color different from the display color of the sub-reflection unit. In this case, a total amount of final output light of the pixel reflection unit is only 0.027q, and brightness of light reflected from the pixel reflection unit is much smaller than brightness of a darkest dark state in a conventional technology.

In summary, in a second display state, a display panel of the present disclosure may realize a dark state that is darker than a conventional technology, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized. Moreover, a pixel reflection unit in a display panel of the present disclosure may display a purer red color, a purer green color or a purer blue color in the first display state, and thus display fullness may be improved.

In one embodiment, a pixel reflection unit in a display panel provided by the present disclosure may further include a third display state and a fourth display state. In the fourth display state, all sub-reflection units of the pixel reflection unit are in a white state, and the pixel reflection unit may have high brightness and a pure white color.

In the third display state, one of the first sub-reflection unit, the second sub-reflection unit, and the third sub-reflection unit is in a white state, and the other two are in a color display state. In this case, light is reflected out after superimposition effects of a white filter and two different color filters. In an actual situation, the sub-reflection units with different colors in a white state may have different reflectivity for light of different colors, and the sub-reflection units with different colors in a color display state may have different reflectivity for light of different colors. Accordingly, when the pixel reflection unit is in operation, three colors may be displayed corresponding to following three states of the sub-reflection units: red/green/white, red/blue/white, and blue/green/white. In the third display state, light experiences filtering effects of one white filter and two different color filters. Since the white filter may have a high reflectivity for light of different colors, a total amount of final reflected light may be greater than the total amount of the final reflected light in the second display state. Accordingly, in the third display state, brightness of the pixel reflection unit may be greater than the brightness of the pixel reflection unit in the second display state, and smaller than the brightness of the pixel reflection unit in the fourth display state.

The third display state is an intermediate state. In the third display state, the pixel reflection unit displays a color between white and black, and may exhibit an intermediate brightness. Respective brightness of the three colors that may be displayed in the third display state is related to the reflectivity of lights with different colors of the sub-reflection units of an actual product in a white state and the reflectivity of lights with different colors of the sub-reflection units of an actual product in a color display state.

A pixel reflection unit provided by the present disclosure may be used as a smallest display unit. By using different pixel reflection units cooperating with each other (for example, two or three pixel reflection units may collectively display as one display unit), a plurality of different colors may be displayed. Accordingly, color gamut may be increased, and color fullness of display may be improved. Moreover, a pixel reflection unit provided by the present disclosure may display a purer red color, a purer green color or a purer blue color, and thus display fullness may be improved in color mixing.

Figure 10:
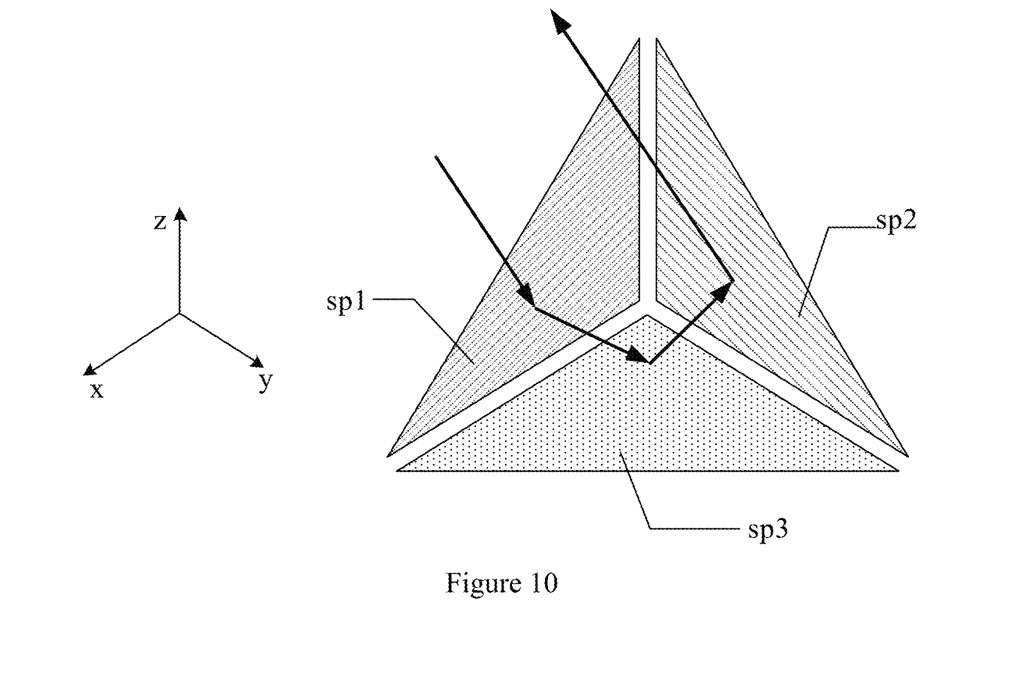
FIG. 10 illustrates a schematic view of another pixel reflection unit of an exemplary solid-state reflective display panel, consistent with the disclosed embodiments of the present disclosure.

FIG. 10 illustrates a schematic view of another pixel reflection unit of an exemplary solid-state reflective display panel. FIG. 10 is a simplified illustration of a first surface M1, a second surface M2 and a third surface M3. In a pixel reflection unit, an angle between any two of the first surface M1, the second surface M2 and the third surface M3 is 90 degrees. In this configuration, a dark state that is darker than a conventional technology may be achieved, and display contrast may thus be improved. In addition, the present disclosure may realize a darker dark state, and does not need to additionally set a filter to achieve a better dark state as in a conventional technology. Accordingly, light loss may be reduced compared to a conventional technology, and high brightness display may be realized. Moreover, the three surfaces are perpendicular to each other, that is, the three sub-reflection units in the pixel reflection unit form a corner of a cube. According to the law of reflection of light, when an incident light reaches an interface, the incident light and a reflected light make a same angle with a normal line of the interface. Regardless of which sub-reflection unit light is first incident on, the light incident on the pixel reflection unit may be sequentially reflected by the three sub-reflection units and then emitted out in a direction in which the original incident light is located. In this configuration, a light-emitting direction of the display panel may be adjusted by appropriately setting the pixel reflection unit and an incident direction of a light source, and display effects may thus be improved.

In one embodiment, as shown in FIG. 10, in a pixel reflection unit of a display panel provided by the present disclosure, the first surface M1, the second surface M2, and the third surface M3 are all right-angled triangles, and oblique sides of the three right-angled triangles are located on a same plane. That is, in the pixel reflection unit, areas of incident surfaces of the three sub-reflection units may be substantially equal and the three sub-reflection units are arranged adjacent to each other to form a pixel reflection unit with a triangular pyramid shape. Accordingly, after light is incident on the pixel reflection unit, the light may be emitted out after modulations of the three sub-reflection units.

In a case where an area of one or two sub-reflection units is too small, when the pixel reflection unit is in display, light may not be completely emitted out after modulations of the three sub-reflection units. Thus, the pixel reflection unit may not display certain colors and color fullness of display may be affected. In the configuration shown in FIG. 10, since the three sub-reflection units have a same area, the above case may be avoided in the present disclosure.

Meanwhile, the three surfaces are perpendicular to each other, that is, the three sub-reflection units in the pixel reflection unit form a corner of a cube. According to the law of reflection of light, when an incident light reaches an interface, the incident light and a reflected light make a same angle with a normal line of the interface. Regardless of which sub-reflection unit light is first incident on, the light incident on the pixel reflection unit may be sequentially reflected by the three sub-reflection units and then emitted out in a direction where the original incident light is located. This configuration may keep a direction of light propagation unchanged, and may improve brightness of the light emitted out.

In some embodiments, with continued reference to FIG. 7 and FIG. 8, in one pixel reflection unit, angles formed by the first surface M1, the second surface M2, and the third surface M3 respectively with respect to a plane where the display panel is located are $\theta 1$, $\theta 2$, and $\theta 3$, where $\theta 1=\theta 2=\theta 3$. The plane where the display panel is located is indicated by a line ZX in the cross-sectional view, and the line ZX is parallel to the plane where the display panel is located. In the present disclosure, the display panel may realize a dark state that is darker than a conventional technology, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized. Moreover, a condition $\theta 1=\theta 2=\theta 3$ is realized, that is, relative positions of the first sub-reflection unit, the second sub-reflection unit, and the third sub-reflection unit to the plane where the display panel is located are same. When an incident angle of incident light with respect to the display panel is same, regardless of which sub-reflection unit the incident light is first incident on, an emitting angle of emitted light after a final reflection with respect to the display panel is consistent. Thereby, consistency of an overall light-emitting direction of the display panel may be achieved, and display effect may thus be improved.

With continued reference to FIG. 6, orthographic projections of the first sub-reflection pixel reflection unit sp1, the second sub-pixel reflection unit sp2, and the third sub-pixel reflection unit sp3 on the array substrate are all triangular. An orthographic projection direction of the sub-reflection units to the array substrate is same as the top view direction. In the top view shown in FIG. 6, the orthographic projection of the first sub-reflection unit sp1 on the array substrate coincides with the first sub-reflection unit sp1 in the top view. The orthographic projection of the second sub-reflection unit sp2 on the array substrate coincides with the second sub-reflection unit sp2 in the top view. The orthographic projection of the third sub-reflection unit sp3 on the array substrate coincides with the third sub-reflection unit sp3 in the top view.

In the present disclosure, the display panel may realize a dark state that is darker than a conventional technology, and thus display contrast may be improved. In addition, since the present disclosure may realize a darker dark state, it is not necessary to additionally set a filter for achieving a better dark state as in a conventional technology. Accordingly, light loss may be reduced compared to a conventional technology, and high brightness display may be realized.

Moreover, each of the sub-reflection units is designed as a triangle. In an arrangement shown in FIG. 6, one pixel reflection unit P may display in cooperation with two or three adjacent pixel reflecting units P to enhance fullness of a display color. In addition, in this arrangement, the pixel reflection units P are closely arranged, as such a space of the display area may be fully utilized, and display resolution may be improved.

Figure 11:
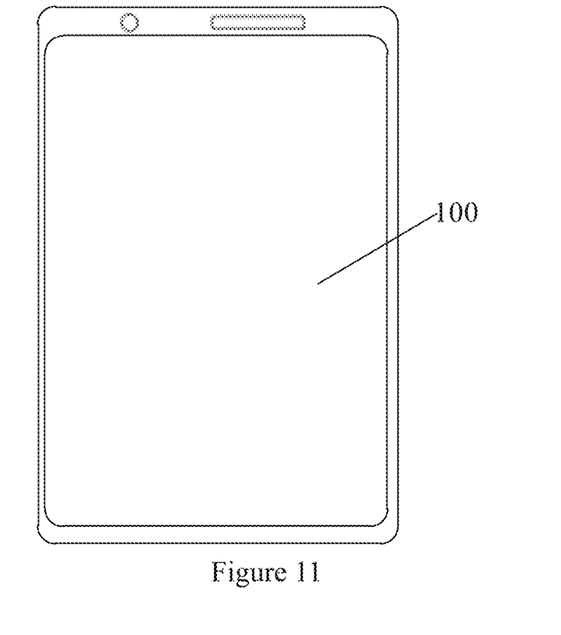
FIG. 11 illustrates a schematic view of an exemplary display device consistent with the disclosed embodiments of the present disclosure.

The present disclosure also provides a display device. FIG. 11 illustrates a schematic view of an exemplary display device consistent with the disclosed embodiments of the present disclosure. As shown in FIG. 11, the display device includes a solid-state reflective display panel 100 according to any one of the embodiments of the present disclosure. The display device provided by the present disclosure may be any electronic product having a display function, including but not limited to the following categories: television, notebook computer, desktop display, tablet computer, digital camera, mobile phone, smart bracelet, smart glasses, on-board display, medical equipment, industrial control equipment, touch interactive terminals, etc.

As disclosed, the technical solutions of the present disclosure have the following advantages.

A pixel reflection unit in a display panel provided by the present disclosure has a three-dimensional structure including at least two sub-reflection units. After light is incident on the pixel reflection unit, the light is emitted after filtering of the at least two sub-reflection units to realize display. The present disclosure may realize a dark state that is darker than a conventional technology, and display contrast may thus be improved. In addition, the present disclosure does not need to additionally set a filter to achieve a better dark state as in a conventional technology. Accordingly, light loss may be reduced compared to a conventional technology, and high brightness display may be realized.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this disclosure, such other modifications, equivalents, or improvements to the disclosed embodiments are intended to be encompassed within the scope of the present disclosure.

What is claimed is:

1. A solid-state reflective display panel, comprising:
   an array substrate; and
   pixel reflection units disposed on the array substrate, wherein each of the pixel reflection units includes sub-reflection units, and each of the sub-reflection units includes a heating element, a reflecting layer, a resonant cavity and a phase change material layer, stacked in sequence along a direction away from the array substrate, and the sub-reflection units include at least a first sub-reflection unit and a second sub-reflection unit that are adjacent to each other,
   wherein in one of the pixel reflection units:
      the first sub-reflection unit includes a first surface, and the first surface is a top surface of the first sub-reflection unit away from the heating element;
      the second sub-reflection unit includes a second surface, and the second surface is a top surface of the second sub-reflection unit away from the heating element; and
      the first surface and the second surface are not parallel to each other and an angle between the first surface and the second surface is less than 180 degrees, such that an incident light is reflected and filtered by at least the first sub-reflection unit and the second sub-reflection unit sequentially.

2. The display panel according to claim 1, wherein:
   in the first sub-reflection unit, in a direction from the heating element to the phase change material layer, the resonant cavity has a thickness $d1$; and
   in the second sub-reflection unit, in a direction from the heating element to the phase change material layer, the resonant cavity has a thickness $d2$, wherein $d1 \neq d2$.

3. The display panel according to claim 1, wherein, in one of the pixel reflection units, the angle between the first surface of the first sub-reflection unit and the second surface of the second sub-reflection unit is 90 degrees.

4. The display panel according to claim 1, wherein, in one of the pixel reflection units, an angle formed by each of the first surface and the second surface with a plane where the display panel is located is $\theta 1$ and $\theta 2$ respectively, wherein $\theta 1 = \theta 2$.

5. The display panel according to claim 1, wherein each of orthographic projections of the first sub-reflection unit and the second sub-reflection unit on the array substrate is rectangular.

6. The display panel according to claim 1, wherein:
   each of the first sub-reflection unit and the second sub-reflection unit includes a color display state and a white state, and colors in the color display states of the first sub-reflection unit and the second sub-reflection unit are different;
   the pixel reflection unit includes a first display state and a second display state;
   in the first display state, one of the first sub-reflection unit and the second sub-reflection unit is in the color display state, and the other is in the white state; and
   in the second display state, each of the first sub-reflection unit and the second sub-reflection unit is in the color display state.

7. The display panel according to claim 6, wherein the pixel reflection unit further includes a third display state, and in the third display state, each of the first sub-reflection unit and the second sub-reflection unit is in the white state.

8. The display panel according to claim 1, wherein the pixel reflection unit includes switching diodes located on the array substrate, and one of the sub-reflection units is electrically connected to one of the switching diodes.

9. The display panel according to claim 1, wherein:
   the sub-reflection units further include a third sub-reflection unit, and the third sub-reflection unit is adjacent to each of the first sub-reflection unit and the second sub-reflection unit respectively; and
   in one of the pixel reflection units, the third sub-reflection unit includes a third surface, and the third surface is a surface of the third sub-reflection unit on a side away from the heating element; and an angle between the third surface and the first surface is less than 180 degrees, and an angle between the third surface and the second surface is less than 180 degrees.

10. The display panel according to claim 9, wherein:
   in the first sub-reflection unit, in a direction from the heating element to the phase change material layer, the resonant cavity has a thickness $d1$;
   in the second sub-reflection unit, in a direction from the heating element to the phase change material layer, the resonant cavity has a thickness $d2$; and
   in the third sub-reflection unit, in a direction from the heating element to the phase change material layer, the resonant cavity has a thickness $d3$, wherein $d1 \neq d2 \neq d3$.

11. The display panel according to claim 9, wherein:
each of the first sub-reflection unit, the second sub-reflection unit, and the third sub-reflection unit includes a color display state and a white state, and colors in the color display states of the first, second, and third sub-reflection units are different;
the pixel reflection unit includes a first display state and a second display state;
in the first display state, one of the first, second, and third sub-reflection units is in the color display state, and other two of the first, second, and third sub-reflection units are in a white state; and
in the second display state, each of the first, second, and third sub-reflection units is in the color display state.

12. The display panel according to claim 11, wherein:
the pixel reflection unit further includes a third display state and a fourth display state;
in the third display state, one of the first, second, and third sub-reflection units is in the white state, and other two of the first, second, and third sub-reflection units are in the color display state; and
in the fourth display state, each of the first, second, and third sub-reflection units is in the white state.

13. The display panel according to claim 9, wherein, in one of the pixel reflection units, an angle between any two of the first surface, the second surface, and the third surface is 90 degrees.

14. The display panel according to claim 13, wherein:
each of the first surface, the second surface, and the third surface is a right-angled triangle, and
an oblique side of the right-angled triangle of each of the first surface, the second surface, and the third surface is located on a same single plane.

15. The display panel according to claim 9, wherein in one of the pixel reflection units, an angle formed by each of the first surface, the second surface, and the third surface with a plane where the display panel is located is θ1, θ2, and θ3 respectively, wherein θ1=θ2=θ3.

16. The display panel according to claim 9, wherein an orthographic projection of each of the sub-reflection unit, the second sub-reflection unit, and the third sub-reflection unit on the array substrate is triangular.

17. A display device, comprising:
a solid-state reflective display panel, comprising:
an array substrate; and
pixel reflection units disposed on the array substrate, wherein each of the pixel reflection units includes sub-reflection units, and each of the sub-reflection units includes a heating element, a reflecting layer, a resonant cavity and a phase change material layer, stacked in sequence along a direction away from the array substrate, and the sub-reflection units include at least a first sub-reflection unit and a second sub-reflection unit that are adjacent to each other,
wherein in one of the pixel reflection units:
the first sub-reflection unit includes a first surface, and the first surface is a top surface of the first sub-reflection unit away from the heating element;
the second sub-reflection unit includes a second surface, and the second surface is a top surface of the second sub-reflection unit away from the heating element; and
the first surface and the second surface are not parallel to each other and an angle between the first surface and the second surface is less than 180 degrees, such that an incident light is reflected and filtered by at least the first sub-reflection unit and the second sub-reflection unit sequentially.

* * * * *